US012008009B2

(12) United States Patent
Vaya et al.

(10) Patent No.: US 12,008,009 B2
(45) Date of Patent: Jun. 11, 2024

(54) PRE-COMPUTATION AND MEMOIZATION OF SIMULATIONS

(71) Applicant: PAYPAL, INC., San Jose, CA (US)

(72) Inventors: Chirag Vaya, San Jose, CA (US); Zhiyuan Li, Fremont, CA (US); Mohmed Hussain Allabakas, Pleasanton, CA (US)

(73) Assignee: PAYPAL, INC., San Jose, CA (US)

( * ) Notice: Subject to any disclaimer, the term of this patent is extended or adjusted under 35 U.S.C. 154(b) by 190 days.

(21) Appl. No.: 17/516,541

(22) Filed: Nov. 1, 2021

(65) Prior Publication Data

US 2023/0137497 A1 May 4, 2023

(51) Int. Cl.
*G06F 16/248* (2019.01)
*G06F 16/2455* (2019.01)
*G06Q 20/40* (2012.01)

(52) U.S. Cl.
CPC ...... *G06F 16/248* (2019.01); *G06F 16/24553* (2019.01); *G06Q 20/4016* (2013.01)

(58) Field of Classification Search
CPC ............ G06F 16/248; G06F 16/24553; G06Q 20/4016
See application file for complete search history.

(56) References Cited

U.S. PATENT DOCUMENTS

| | | | | |
|---|---|---|---|---|
| 9,094,291 B1* | 7/2015 | Jackson | .............. | H04L 41/0604 707/722 |
| 9,305,056 B1* | 4/2016 | Gupta | ............... | G06F 16/24552 707/722 |
| 11,263,242 B1* | 3/2022 | Huang | .................... | G06F 16/13 707/722 |
| 11,636,128 B1* | 4/2023 | Bigdelu | ............. | G06F 16/2428 707/722 |
| 11,687,936 B2* | 6/2023 | Ur | ...................... | G06Q 10/0635 705/75 |
| 2010/0114774 A1* | 5/2010 | Linaman | ................ | G06Q 40/02 705/44 |
| 2011/0238566 A1* | 9/2011 | Santos | ................... | G06Q 40/03 705/38 |

(Continued)

FOREIGN PATENT DOCUMENTS

AU 2021102594 A4 * 7/2021 ............. G06Q 40/02

*Primary Examiner* — Yuk Ting Choi
(74) *Attorney, Agent, or Firm* — Haynes and Boone, LLP

(57) ABSTRACT

Systems and methods for pre-computing and memoizing simulations are disclosed. In an embodiment, a computer system may retrieve processing filters for running a simulation. The computer system may generate a simulation query based on the simulation filters and hash the simulation query. The computer system may determine whether a simulation result corresponding to the hashed simulation query has been pre-computed and stored. If the simulation result has been pre-computed and stored, the computer system may provide the simulation result in a user interface. If the simulation has not been pre-computed, the computer system may run a simulation and store the simulation results with a mapping to the hashed simulation query. If an identical simulation query is requested, the computer system may match a hash of the simulation query to a stored hash and provide the memoized simulation result without recomputing the simulation result, so simulation processing times can be reduced.

20 Claims, 11 Drawing Sheets

(56) References Cited

U.S. PATENT DOCUMENTS

| | | | |
|---|---|---|---|
| 2017/0091470 A1* | 3/2017 | Infante-Lopez | G06Q 50/01 |
| | | | 707/722 |
| 2020/0081916 A1* | 3/2020 | McShane | G06N 20/00 |
| | | | 707/722 |
| 2020/0210913 A1* | 7/2020 | Daggubati | G06F 16/258 |
| | | | 707/722 |
| 2020/0285898 A1* | 9/2020 | Dong | G06F 18/40 |
| | | | 707/722 |
| 2021/0374756 A1* | 12/2021 | Pandey | G06N 3/08 |
| | | | 707/722 |
| 2023/0089710 A1* | 3/2023 | Schoenheider | H04L 67/34 |
| | | | 707/770 |

* cited by examiner

PRE-COMPUTATION AND MEMOIZATION OF SIMULATIONS

TECHNICAL FIELD

The present disclosure generally relates to computer simulation techniques and more particularly to pre-computation and memoization techniques for computer simulations according to various embodiments.

BACKGROUND

Machine learning and artificial intelligence techniques can be used to improve various aspects of decision making. Machine learning techniques often involve using available data to construct a model that can produce an output (e.g., a decision, recommendation, prediction, etc.) based on particular input data. Training data (e.g., known/labeled data and/or previously classified data) may be used such that the resulting trained model is capable of rendering a decision on unknown data. Electronic service providers may use machine learning and artificial intelligence to evaluate requests for electronic services. Using various input data, machine learning models may output scores associated with a request for an electronic service. Some user accounts may activate processing rules that filter electronic interactions and electronic transactions with other end users based on these scores. The present disclosure provides systems and methods to improve processing efficiencies for running simulations related to optimizing such processing rules for desired performance metrics, thereby improving computer system function via faster processing times for these and related operations.

Figure 1A:
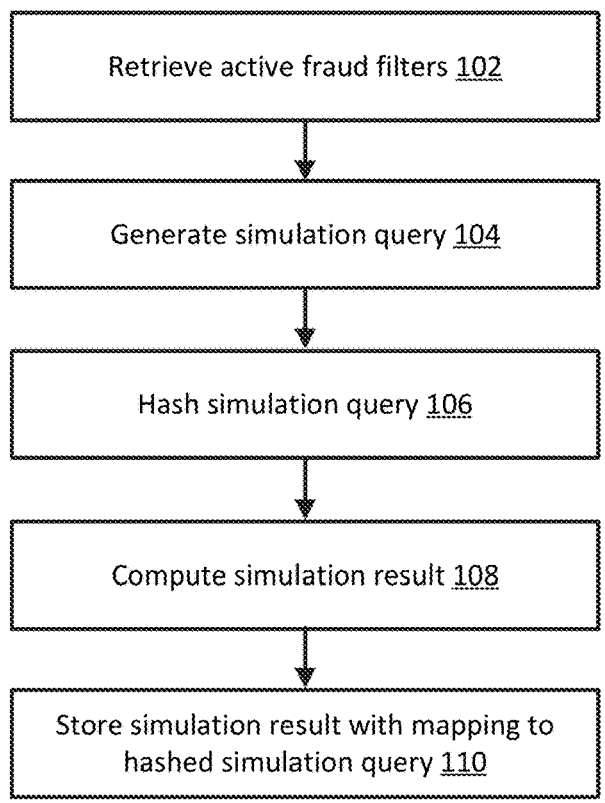
FIG. 1A illustrates a flow diagram of a process for pre-computing simulations in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. It will be appreciated that the techniques disclosed herein provide improvements to computer processing technology. For example, as further discussed below, retrieving pre-computed simulation results without repeating computations allows for simulation processing times to be reduced. Further, by memoizing simulation results in a fast-performance database, parallel simulations or quick succession simulations may be run in a way where previously computed simulations can be quickly accessed and re-used to avoid unnecessary computer processing. One or more embodiments of the subject disclosure are illustrated by and/or described in connection with one or more figures and are set forth in the claims.

User accounts may interact with other user accounts in various systems. These accounts may in some instances perform electronic transactions or other electronic interactions with one another using electronic services provided by an electronic service provider. In some cases, electronic transactions may include transferring ownership of an asset (e.g., file permissions within a file system, digital ownership rights, an electronic payment transaction, or transfer of another electronic asset). When these transactions are recorded in a log and/or a database, a history of the transactions is developed. Certain account and transaction patterns may be indicative of certain types of actions performed by the user accounts, and in some cases, these actions may violate authorized use policies (AUPs) or otherwise be illegal and/or undesired by system owners. Identifying such patterns via human analysis may be difficult or impossible, however.

Machine learning and artificial intelligence techniques can identify accounts and/or interactions that may be violating terms of service, committing a security violation, and/or performing illegal actions in a way that is not easily ascertainable (or impossible to ascertain) from human analysis. Such identification may be provided in the form of risk scores or other scores that indicate how likely the account and/or interaction is engaged in said actions and/or how confident that the scoring mechanism is in stating that the account and/or interaction is engaged in said actions. Examples of different scores may include transaction risk scores, IP address risk scores, mobile phone risk scores, emulator risk scores, fake email scores, geolocation risk scores, and other scores that quantify a riskiness or other quality of an interaction or transaction.

In some embodiments, a user account (e.g., a merchant account) may be registered with an electronic transaction service provider. The user account may adjust processing rules associated with the user account, where the processing rules operate by taking the scores or other quantifying variables as input and outputting whether an electronic service, such as a transaction, or more generally an interaction between the user account and another end user, is processed. In other words, a processing rule may dictate whether an interaction is approved or rejected by filtering for scores. A user account may have one or more active processing rules, where each processing rule may have one or more filters comprised of threshold(s) that can be adjusted to define how the processing rule will operate for the user account.

As an illustration, one processing rule for the user account may relate to IP address risk scores. The processing rule may have a filter that causes transactions that have an IP address risk score, calculated based on an IP address corresponding to a counterparty end user in an interaction, that meets a threshold to be rejected (e.g., not processed for the user account) or approved (e.g., fully processed). To further illustrate, the processing rule for the IP address risk score may have a filter that rejects transactions that have an IP address risk score that is greater than a 0.80 threshold. The IP address risk scores may be determined for each transaction in real-time by a fraud risk assessment system, for example.

Such processing rules may be implemented to reduce fraudulent transactions such as fraudulent chargeback transactions. As discussed herein, chargeback fraud may include circumstances in which a user account makes an online purchase with their own credit card or other financial instrument (e.g., payment account balance or account currency), and then requests a chargeback from the issuing bank (or electronic transaction service provider) after receiving the purchased goods or services. Once approved, the chargeback cancels the transaction, and the user account receives a refund of the money spent while also keeping the purchased goods or services.

Fraud simulation allows a merchant to predict future results for their user account in terms of various performance metrics including revenue and chargeback transactions based on previously observed fraud patterns. A merchant may use simulations to adjust processing rule filter thresholds and safeguard their user account from future fraud attacks of a similar nature to the previously observed fraud. These simulations are compute and resource intensive, and as such, take quite an amount of time to run. The present disclosure provides systems and methods related to pre-compute and memoization which achieve near real-time simulation for a user. Further details and embodiments are described below in reference to the accompanying figures.

In one embodiment, a computer system may retrieve active fraud filters for a user account registered with an electronic service provider. The computer system may generate a simulation query based on the fraud filters and hash the simulation query. The computer system may compute a simulation result based on the active fraud filters and a transaction history for the user account. The simulation result may be stored with a mapping to a hash value corresponding to the hashed simulation query.

At a later time, the computer system may receive a request from or for the user account to run a simulation or a simulation may be run at times determined by the computer system, where both situations are referred to herein as a "request . . . to run a simulation." The computer system may obtain the simulation filters that the user account has selected for the simulation. The computer system may generate a simulation query based on the simulation filters and hash the simulation query. The computer system may determine whether the simulation has been pre-computed by compared the hashed simulation query to database stored hash values mapped to pre-computed simulation results. If the computer system determines a match, the computer system may read the pre-computed simulation results for the user account without computing the simulation results again. If no match is found, the computer system may compute the simulation results and provide the simulation results to the user account. The computed simulation results may also be stored in a database with a mapping to the hash value corresponding to the hashed simulation query so that the computer system can simply read the simulation results if the user account requests another simulation run with the same simulation filters and over the same simulated period.

Figure 1B:
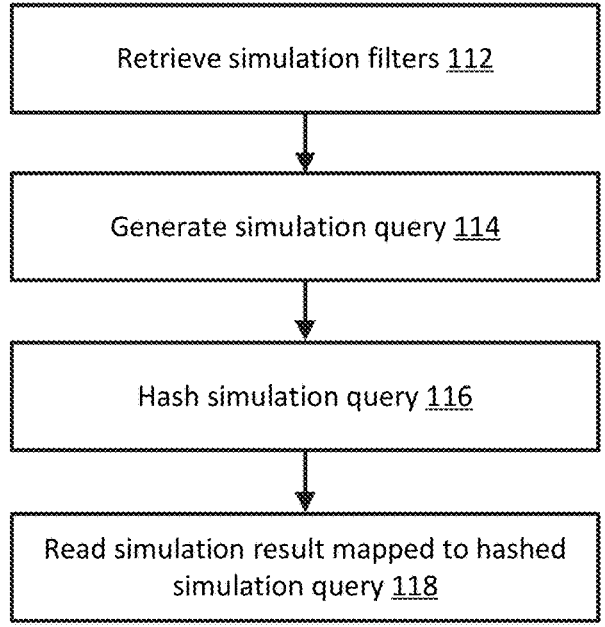
FIG. 1B illustrates a flow diagram of a process for reading pre-computing simulations in accordance with one or more embodiments of the present disclosure.
Figure 2:
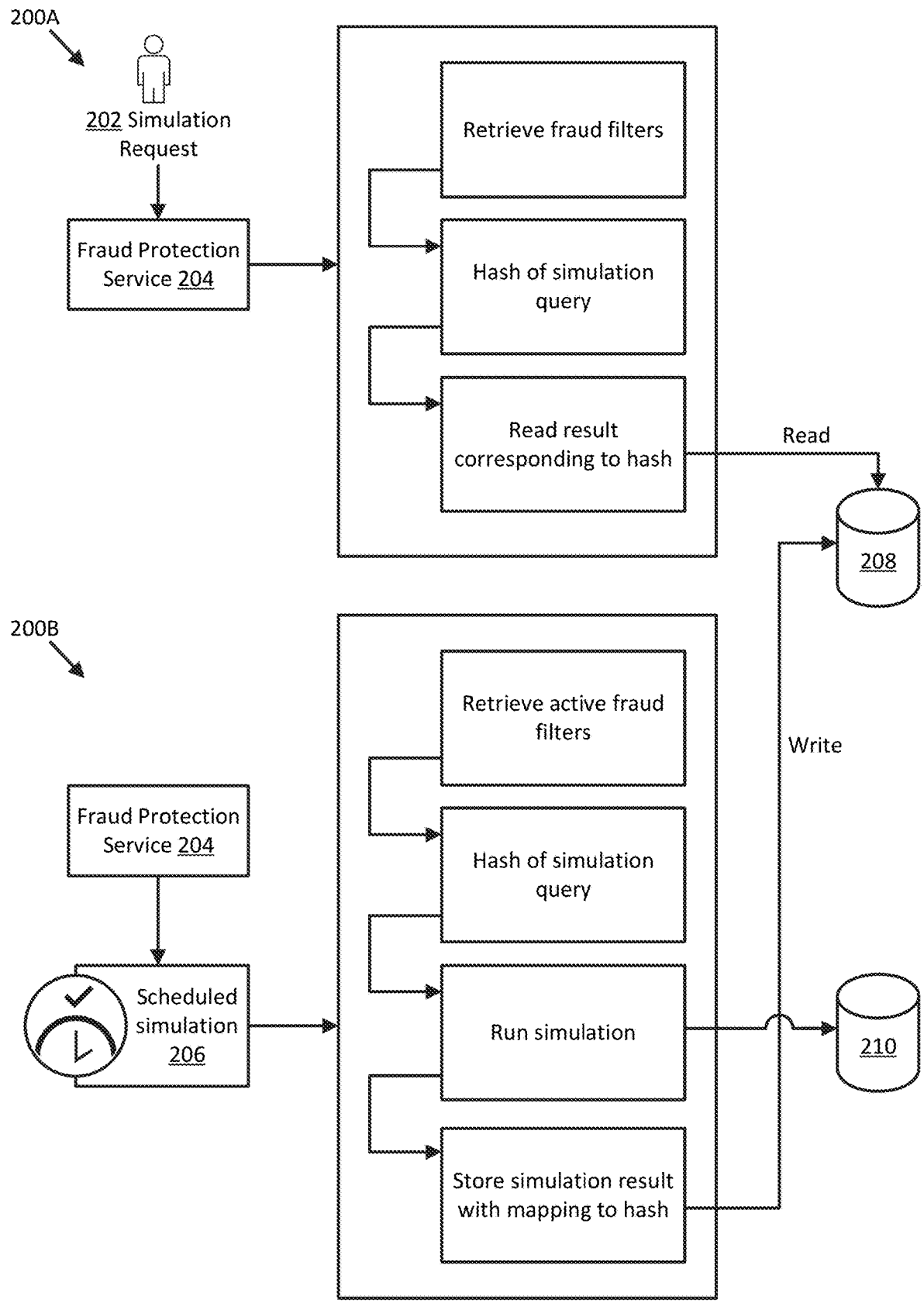
FIG. 2 illustrates a diagram for pre-computing and reading simulations in accordance with one or more embodiments of the present disclosure.

Referring now to FIGS. 1A and 1B, illustrated are flow diagrams of a process 100A for pre-computing simulations and a process 100B for reading pre-computed simulations, in accordance with one or more embodiments of the present disclosure. The blocks of processes 100A and 100B are described herein as occurring in serial, or linearly (e.g., one after another). However, multiple blocks of processes 100A and 100B may occur in parallel. In addition, the blocks of processes 100A and 100B need not be performed in the order shown and/or one or more of the blocks of processes 100A and 100B need not be performed. For explanatory purposes, processes 100A and 100B are primarily described herein with reference to FIG. 2.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

A computer system may perform the operations of processes described in the present disclosure. The computer system may include a non-transitory memory (e.g., a machine-readable medium) that stores instructions and one or more hardware processors configured to read/execute the instructions to cause the computer system to perform the operations of said processes. In various embodiments, the computer system may include one or more computer systems 1100 of FIG. 11.

At block 102 of process 100A, the computer system may retrieve active fraud filters for processing rules of a user account. For example, in reference to a situation 200B shown in FIG. 2, the computer system may be associated with a fraud protection service 204. The active fraud processing rule filters for the user account may be the processing rule filters that the user account currently has active to filter out (e.g., reject) transactions that may be fraudulent, such as those likely to be canceled and/or result in a chargeback. In some embodiments, the computer system may retrieve the active fraud filters for the user account by using an account identifier associated with the user account and accessing a database that stores the currently active fraud filters for the user account.

The computer system may retrieve the active fraud filters to perform (e.g., execute, run) a scheduled simulation 206 in some embodiments. The scheduled simulation may be performed at certain intervals, such as periodically (e.g., every day, one or more times per week, one or more times per month, etc.) or non-periodically. The simulation may provide simulated results for a period, which the user account may view to understand how certain processing rule filters may affect the user account's performance metrics. For example, the user account may want to understand how certain processing rule filters affect the number of transactions that get approved or rejected for the user account during the period. As another example, the user account may want to understand how many of the approved transactions during the period may result in a chargeback transaction or require manual review when certain processing rule filters are applied. In yet another example, the user account may want to simulate the period to determine a total payment volume or revenue that can be expected when certain processing rule filters are applied. In some embodiments, the period for which the simulation is run may be for a window of time, such as for the past 30 days, or for a future 30 days.

At block 104 the computer system may generate a simulation query based on the active fraud filters. For example, generating the simulation query may include formatting the fraud filters retrieved at block 102 into an appropriate input format so that it may be inputted into a hash function at block 106.

At block 106, the computer system may hash the simulation query by inputting the simulation query to a hash function. The hash function may output a hash value based on the inputted simulation query. Various hash functions may be implemented in embodiments, such as an MD5 algorithm, a SHA-256 algorithm, or any hashing algorithm that has sufficiently minimal collisions. By hashing the simulation query, the computer system may be able to map data of arbitrary size (e.g., there may be a large number of processing rules filters and different configurations thereof that can produce unique simulation queries), to a fixed size value that is efficient to store and uniquely identify the simulation query for faster query response times.

At block 108, the computer system may compute a simulation result for the user account based on the active fraud filters and a transaction history of the user account. In some embodiments, the computer system may also base the simulation on fraud filters, transaction histories, and performance metrics of other user accounts that may be similar to the subject user account. In some embodiments, the computer system may run the simulation using Apache Hadoop (e.g., platform 210 shown in FIG. 2). Apache Hadoop is a collection of open-source software utilities that facilitates using a network of many computers to solve problems involving massive amounts of data and computation. Apache Hadoop provides a software framework for distributed storage and processing of big data using the MapReduce programming model.

At block 110, the computer system may store (e.g., write) the simulation result to a database 208 with a mapping (e.g., link) to the hashed simulation query. In some embodiments, the database 208 may be a NoSQL database, such as Aerospike, which is a flash-optimized and in-memory open source distributed key value no SQL database. By storing the simulation result with the mapping to the hashed simulation query, at a later time when the user account requests a simulation that has the same fraud processing rule filters (e.g., fraud filters) as those used for the stored simulation result, the computer system may determine that a hash of a simulation query generated based on the fraud filters in the simulation request matches a hash of the simulation result that was stored in database 208. The computer system may then read out the simulation result for the user account without having to run a simulation again. By subsequently retrieving the pre-computed simulation results without repeating the computation, simulation processing times can be reduced, which may improve a user interface experience for the user account.

Turning now to FIG. 1B, the computer system may perform the operations of process 100B for reading pre-computed simulation results, such as in situation 200A. In some embodiments, the pre-computed simulation results may have been stored to database 208 when the computer system executed process 100A of FIG. 1A. At block 112, the computer system may retrieve simulation filters in response to receiving a simulation request 202 from a user account. In some embodiments, the simulation filters may be received as part of the simulation request 202. In other embodiments, the computer system may fetch the simulation filters selected by the user account in a user interface for running simulations for the user account. In some cases, the simulation filters may be the currently active fraud filters for the user account. For example, the user account may desire to see a simulated result for the past 30 days of transactions for the user account (e.g., transactions that are approved, transactions that are rejected, transactions that result in a chargeback, transaction volume or revenue, etc.).

At block 114, the computer system may generate a simulation query based on the simulation filters. For example, the computer system may format the simulation filters retrieved at block 112 into an appropriate input format for input into a hash function at block 116. At block 116, the computer system may hash the simulation query by inputting the simulation query to a hash function that outputs a hash value. According to various embodiments, the hash function used at block 116 may be identical to the hash function used at block 106 in process 100A.

At block 118, the computer system may read out a simulation result that is mapped to the hashed simulation query (i.e., the hash value computed at block 116). For example, the computer system may compare the hash value to hash values stored in database 208 of FIG. 2, match the hash value to one of the stored hash values, and read out a simulation result that was pre-computed, mapped to the hash value, and stored in database 208. The simulation result may be provided in a user interface for the user account. In some embodiments, the simulation result may include a transaction approval score, a transaction rejection score, a transaction chargeback score, and various other performance metrics for the user account such as total payment volume or revenue over the simulated period.

Figure 3:
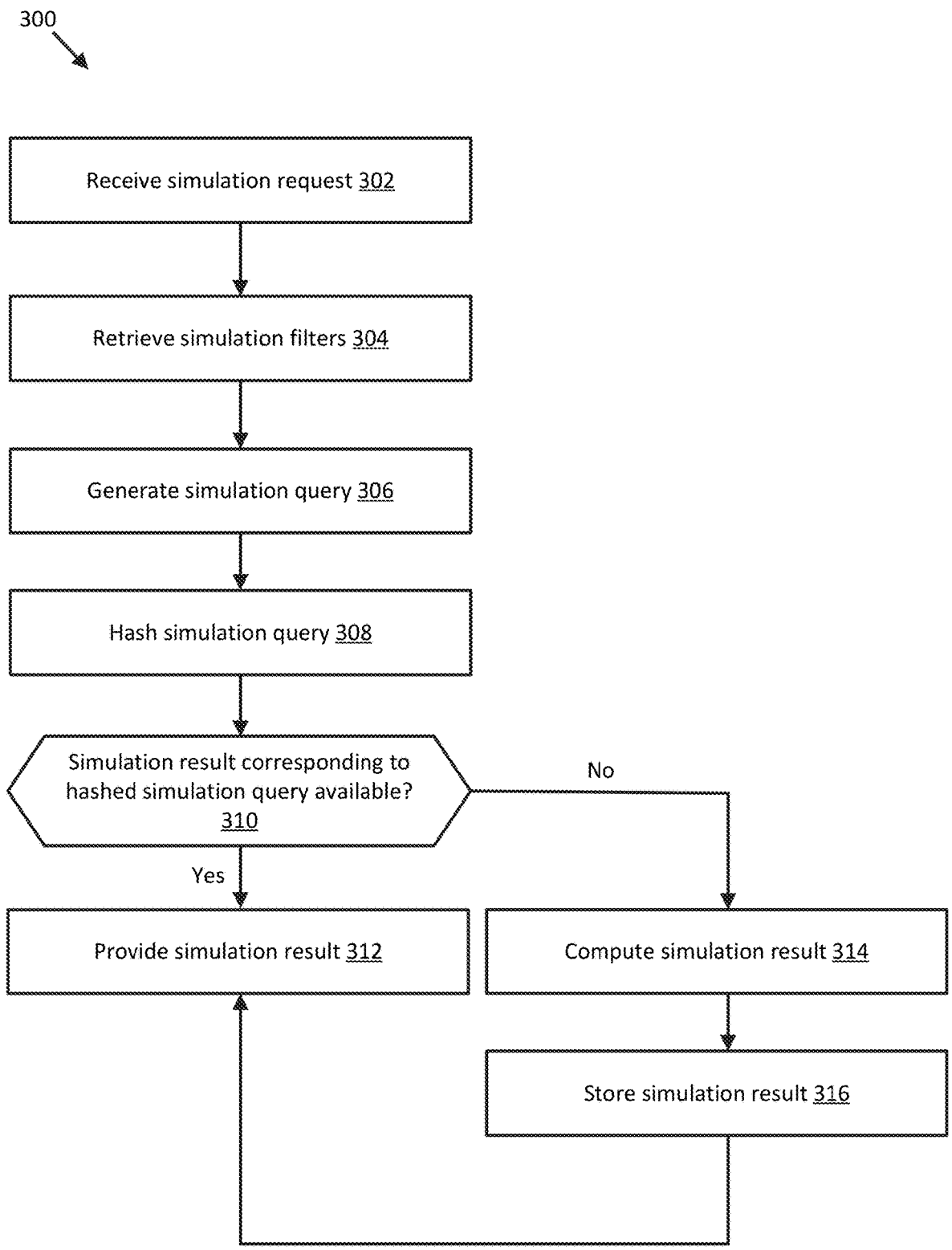
FIG. 3 illustrates a flow diagram of a process for memoizing simulations in accordance with one or more embodiments of the present disclosure.
Figure 4:
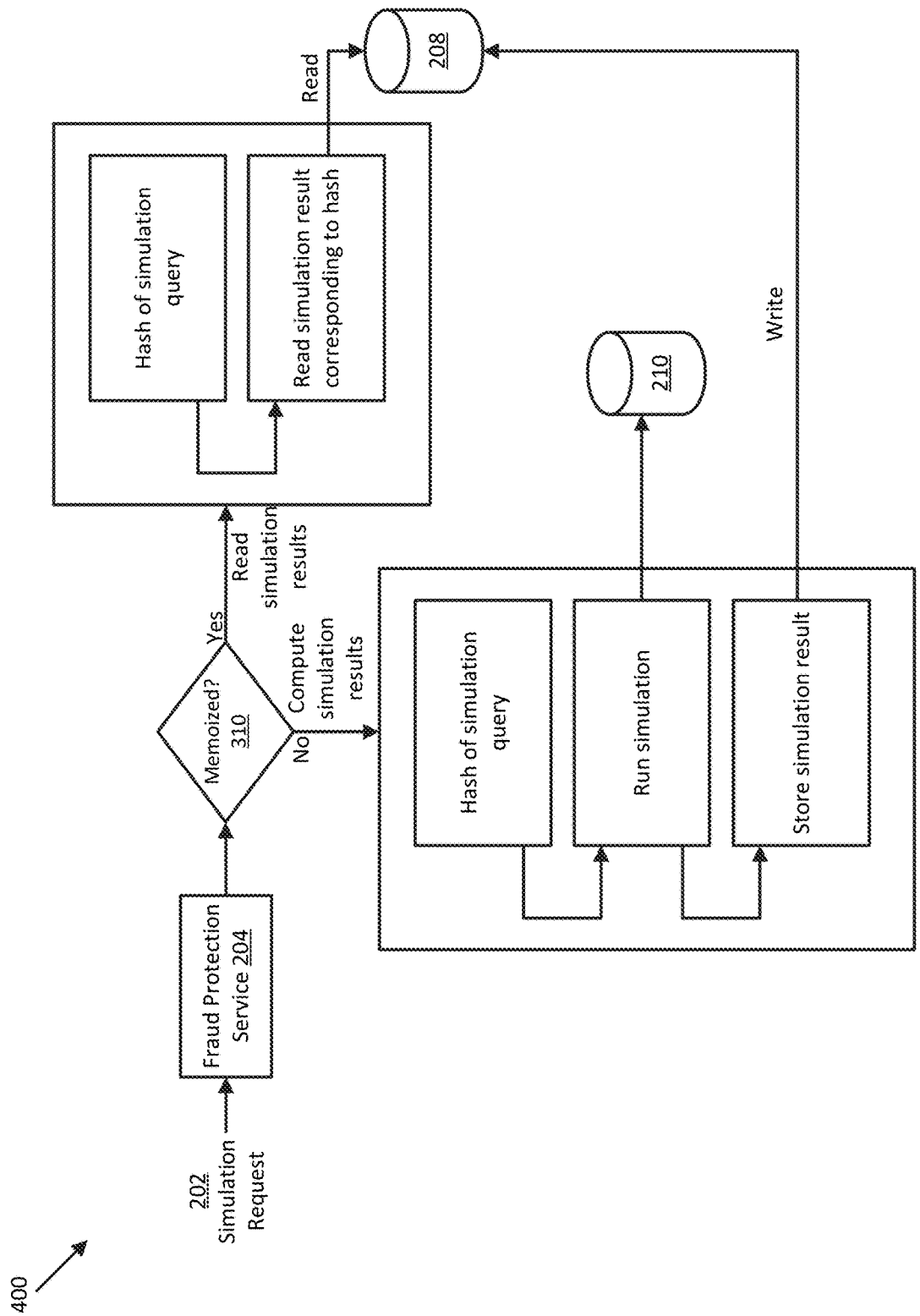
FIG. 4 illustrates a diagram for memoizing simulations in accordance with one or more embodiments of the present disclosure.

Referring now to FIG. 3, illustrated is a flow diagram of a process 300 for simulation memoization in accordance with one or more embodiments of the present disclosure. The blocks of process 300 are described herein as occurring in serial, or linearly (e.g., one after another). However, multiple blocks of process 300 may occur in parallel. In addition, the blocks of process 300 need not be performed in the order shown and/or one or more of the blocks of process 300 need not be performed. For explanatory purposes, process 300 is primarily described herein with reference to diagram 400 of FIG. 4.

At block 302, the computer system may receive a simulation request 302 from a user account. At block 304, the computer system may retrieve simulation filters for running a simulation for the simulation request 302. In some embodiments, the simulation request 302 may include the simulation filters. In other embodiments, the computer system may retrieve the simulation filters selected by the user account in a user interface for running a simulation for the user account. In some cases, the simulation filters may be the currently active fraud filters for the user account by default if no other simulation filters are adjusted or added to the simulation request 302. For example, the user account may desire to see a simulated result for the past 30 days of transactions for the user account (e.g., transactions that are approved, rejected, result in chargebacks, and transaction payment volume or revenue, etc.) with the currently active fraud filters.

At block 306, the computer system may generate a simulation query based on the simulation filters. For example, the computer system may format the simulation filters retrieved at block 304 into an appropriate input format for input into a hash function at block 308. At block 308, the computer system may hash the simulation query by providing the simulation query to a hash function that outputs a hash value. According to various embodiments, the hash function used at block 308 may be identical to the hash function used at block 106 in process 100A.

At block 310, the computer system may determine whether a simulation result corresponding to the hashed simulation query (e.g., hash value from block 308) has been memoized. For example, the computer system may compare the hash value to hash values stored in database 208. If the hash value matches one of the stored hash values, the computer system may proceed to block 312, where the computer system may read out the simulation result that was previously stored and mapped to the hash value. The simulation result may be provided in a user interface for the user account for a user to view.

However, if the hash value does not match one of the hash values stored in database 208, then the computer system may determine that a simulation result has not been previously computed and memoized for the simulation query. Thus, the computer system may proceed to block 314 where the computer system may compute the simulation result for the simulation query. As discussed above, the computer system may compute the simulation result by invoking Apache Hadoop software utilities (e.g., platform 210). For example, the computer system may invoke a network of computers to compute the simulation result by based on a recent transaction history for the user account and the simulation filters for the simulation request.

At block 316, the computer system may store the simulation result computed for the simulation request in the database 208. The simulation result may be mapped to the hash value corresponding to the hashed simulation query. Thus, in later simulation requests that have the same filters, the computer system may retrieve the pre-computed simulation result, by matching a hash value corresponding to the simulation query to a hash value stored in database 208 with a mapping to the simulation result, and provide the pre-computed simulation result to the user account without repeating the computation. Therefore, simulation processing times can be reduced, which may improve a user interface experience for the user account. For example, a user account may desire to run a plurality of simulations in succession or parallel. If the user account runs a first simulation with a first set of filters, runs a second simulation with a second set of filters, then runs a third simulation using the first set of filters again, the computer system can quickly provide the simulation result from the first simulation, which may have been memoized upon running the first simulation.

Figure 5:
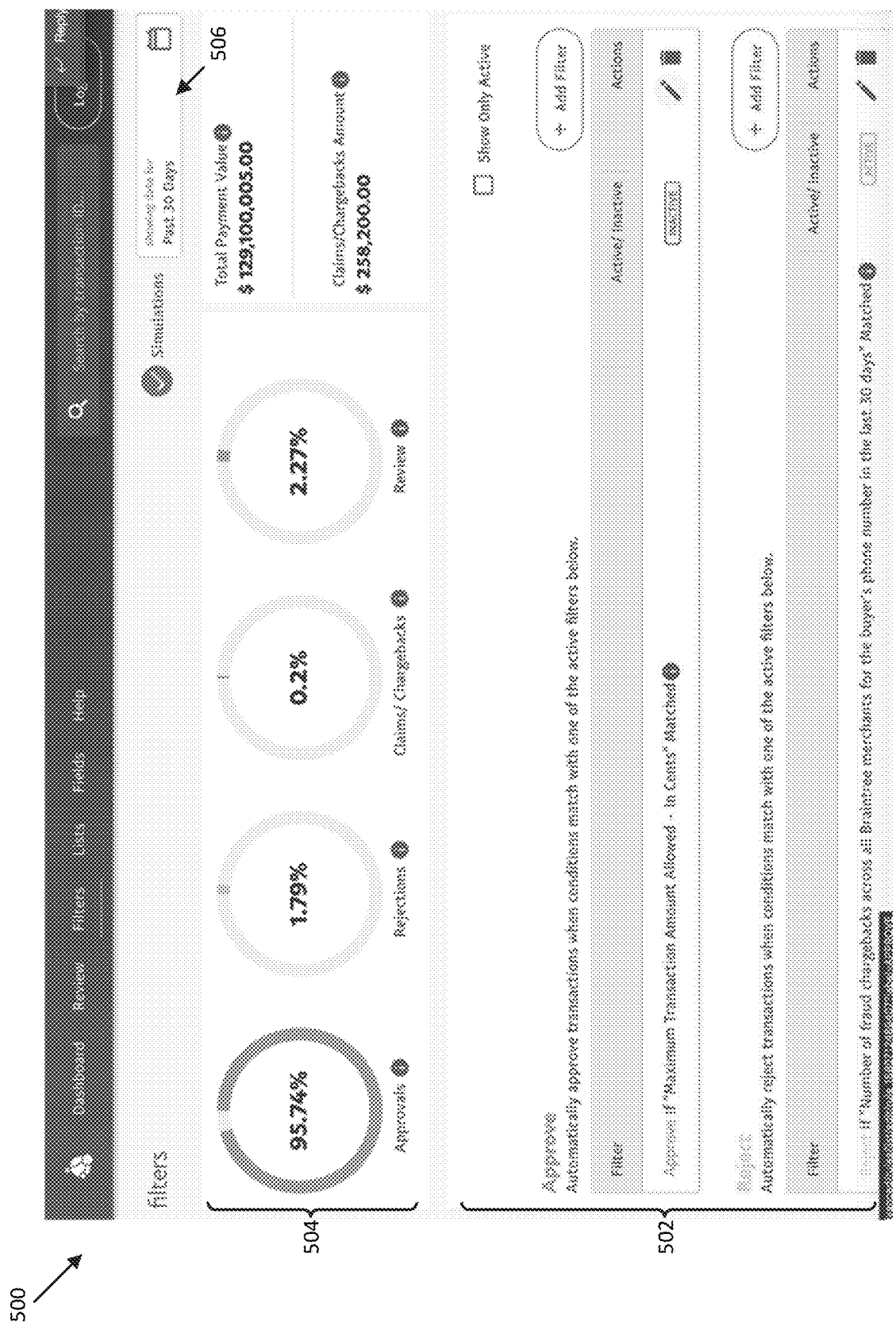
FIG. 5 illustrates a user interface screen corresponding to processing rule filters for a user account in accordance with one or more embodiments of the present disclosure.

FIG. 5 illustrates a user interface screen 500 corresponding to processing rule filters for a user account in accordance with one or more embodiments of the present disclosure. The screen 500 may include a section 502 for a user to edit currently active processing rule filters for the user account. The screen 500 may further include a section 504 that indicates performance metrics for the user account for a period of time 506. For example, the performance metrics may include statistics for transaction approvals, transaction rejections, chargeback transactions, transactions requiring review, total payment value, and chargeback amount.

Figure 6:
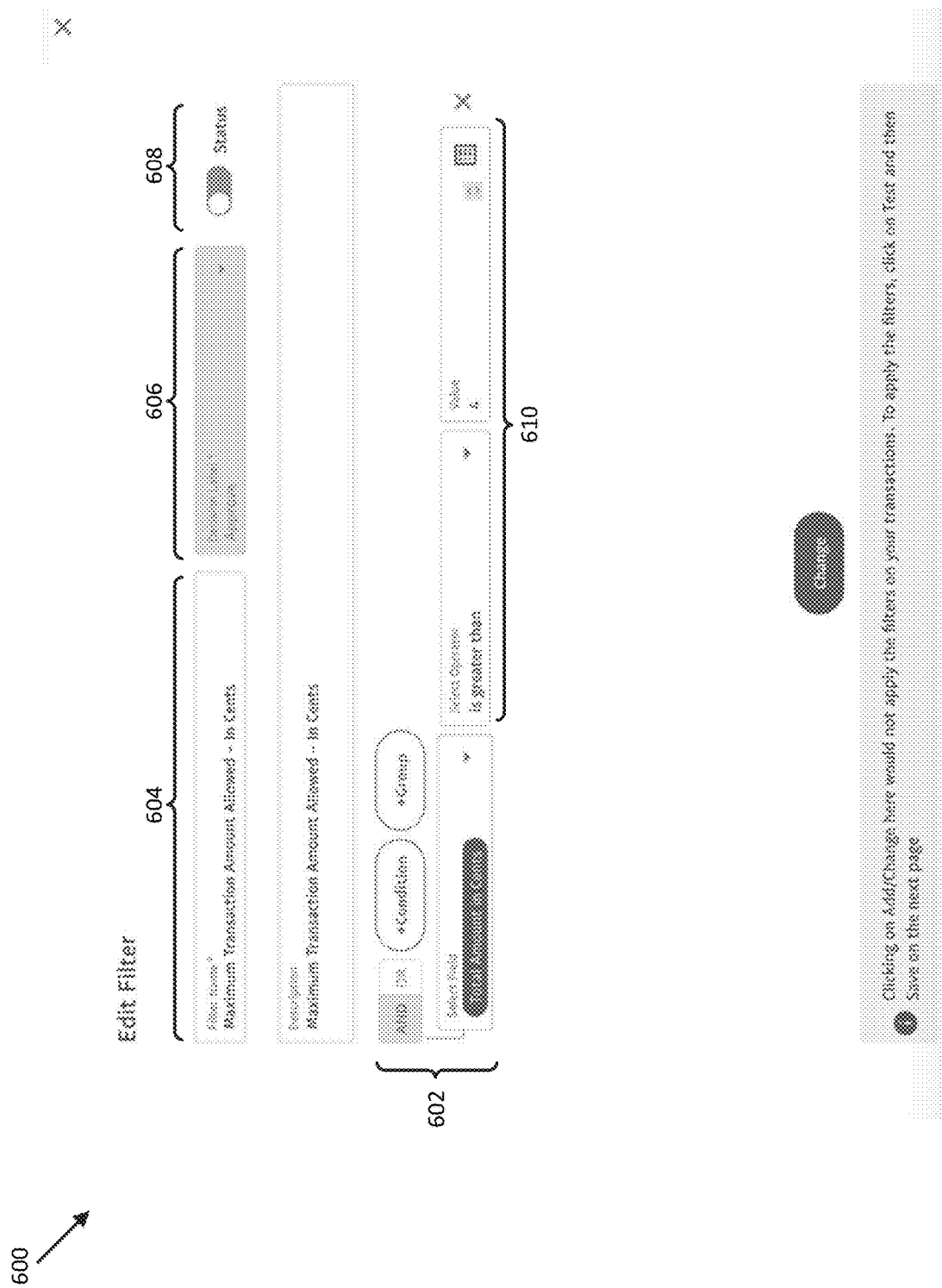
FIG. 6 illustrates a user interface screen for editing an example processing rule filter in accordance with one or more embodiments of the present disclosure.

FIG. 6 illustrates a user interface screen 600 for editing an example processing rule filter 604 in accordance with one or more embodiments of the present disclosure. The screen 600 may include a condition 602 for the processing rule filter 604, where the condition 602 may have an adjustable threshold 610. If the condition is satisfied, the processing rule filter 604 may label a transaction according to the decision label 606. The processing rule filter 604 may be activated or deactivated using status switch 608.

Figure 7:
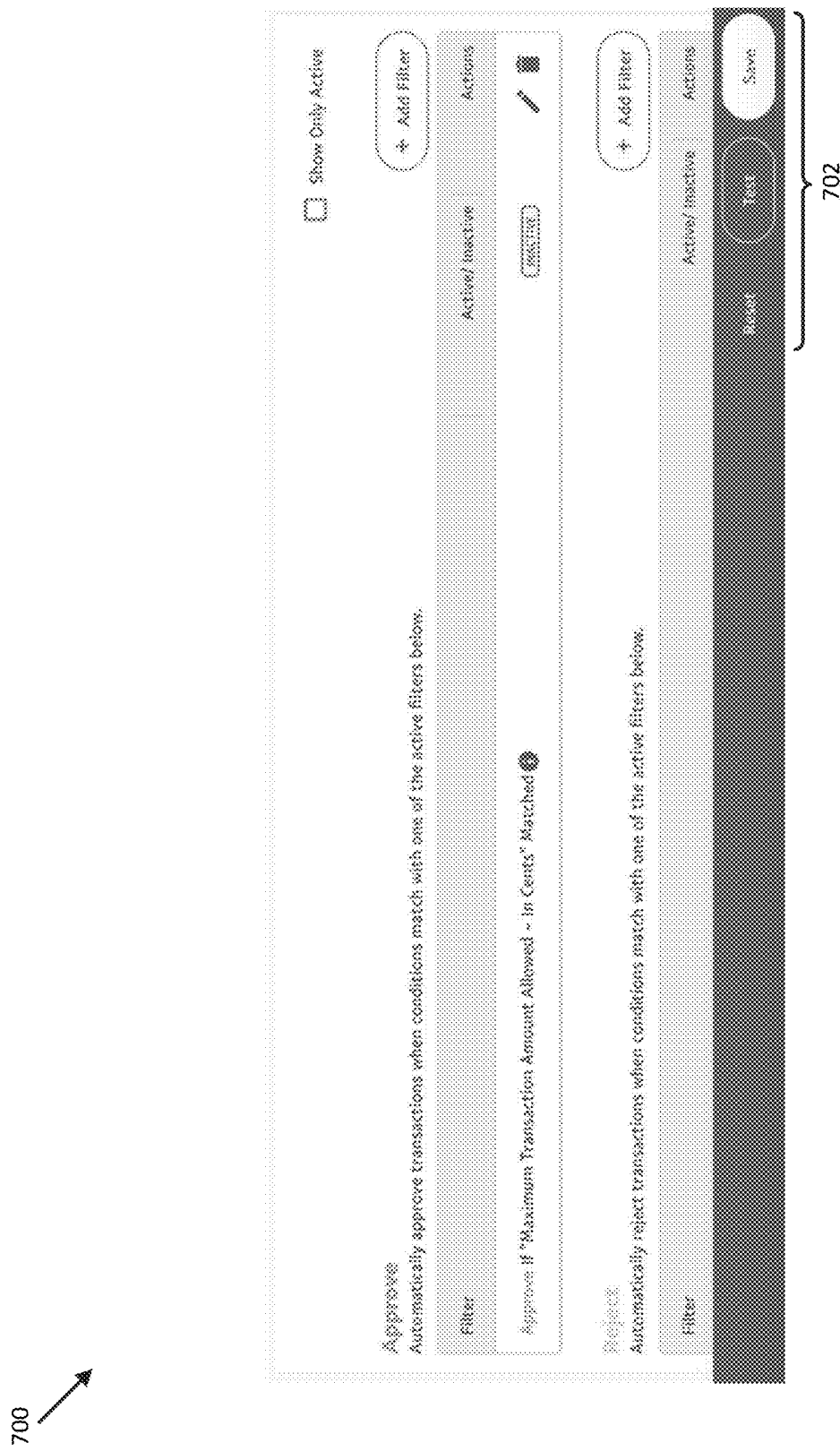
FIG. 7 illustrates a user interface screen for requesting a simulation in accordance with one or more embodiments of the present disclosure.

FIG. 7 illustrates a user interface screen 700 for requesting a simulation in accordance with one or more embodiments of the present disclosure. In some embodiments, the screen 700 may be presented to a user after the user has made changes to the currently active filters for the user account. The screen 700 may include options 702 to save changes made to the active processing rule filters, reset the changes to revert to a previous state before the changes were made, and/or test the changes by running a simulation.

Figure 8:
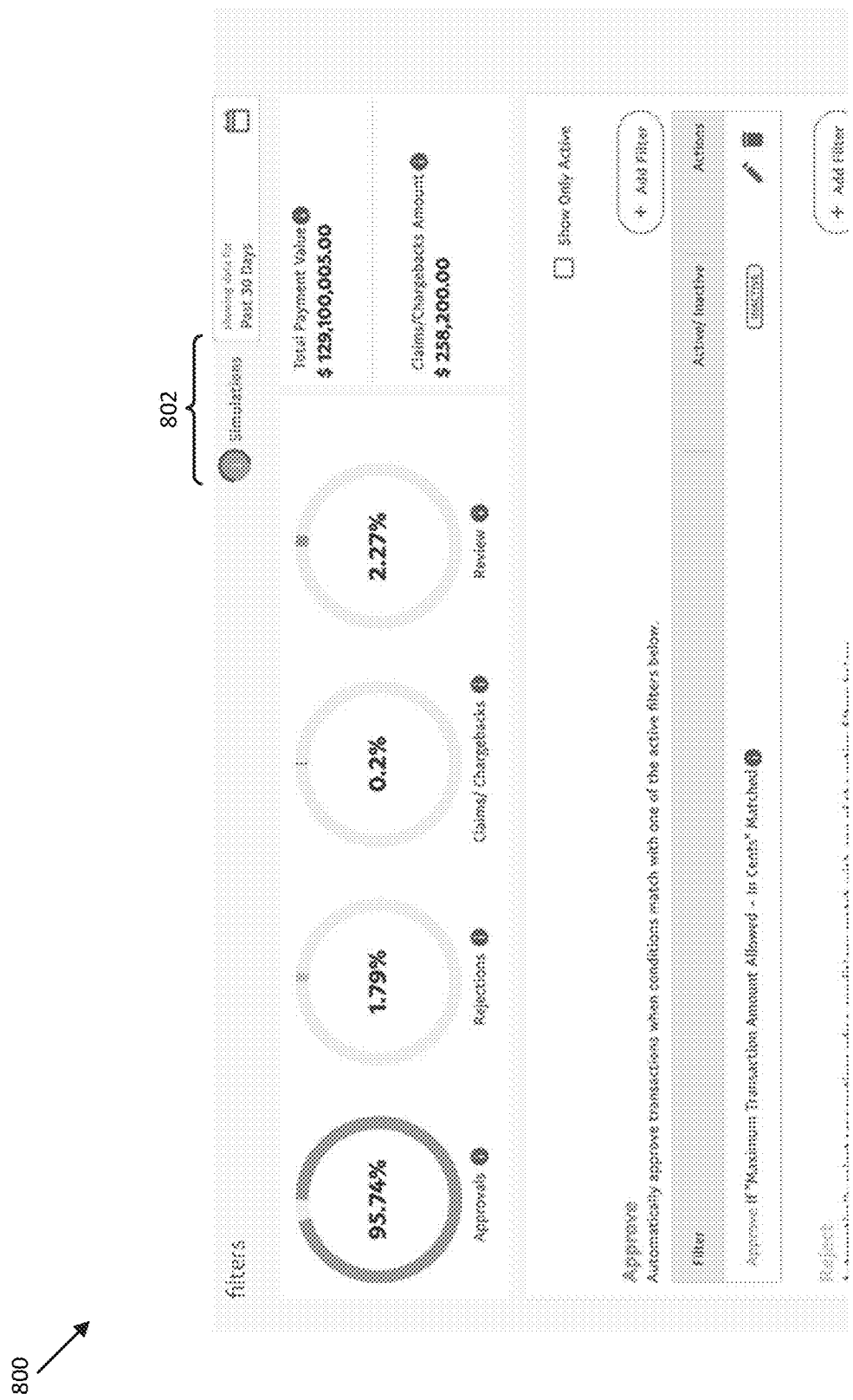
FIG. 8 illustrates a user interface screen for a simulation that is in progress in accordance with one or more embodiments of the present disclosure.

FIG. 8 illustrates a user interface screen 800 for a simulation that is in progress in accordance with one or more embodiments of the present disclosure. For example, the user may have selected to test the changes made to the active processing rule filters at screen 700, which would cause the simulation to run. As simulations may take some time, the screen 800 may allow the user to engage with other aspects of the user interface while the simulation runs in the background. A progress indicator 802 may be provided in the screen 800 in some embodiments to indicate the progress of the running simulation.

Figure 9:
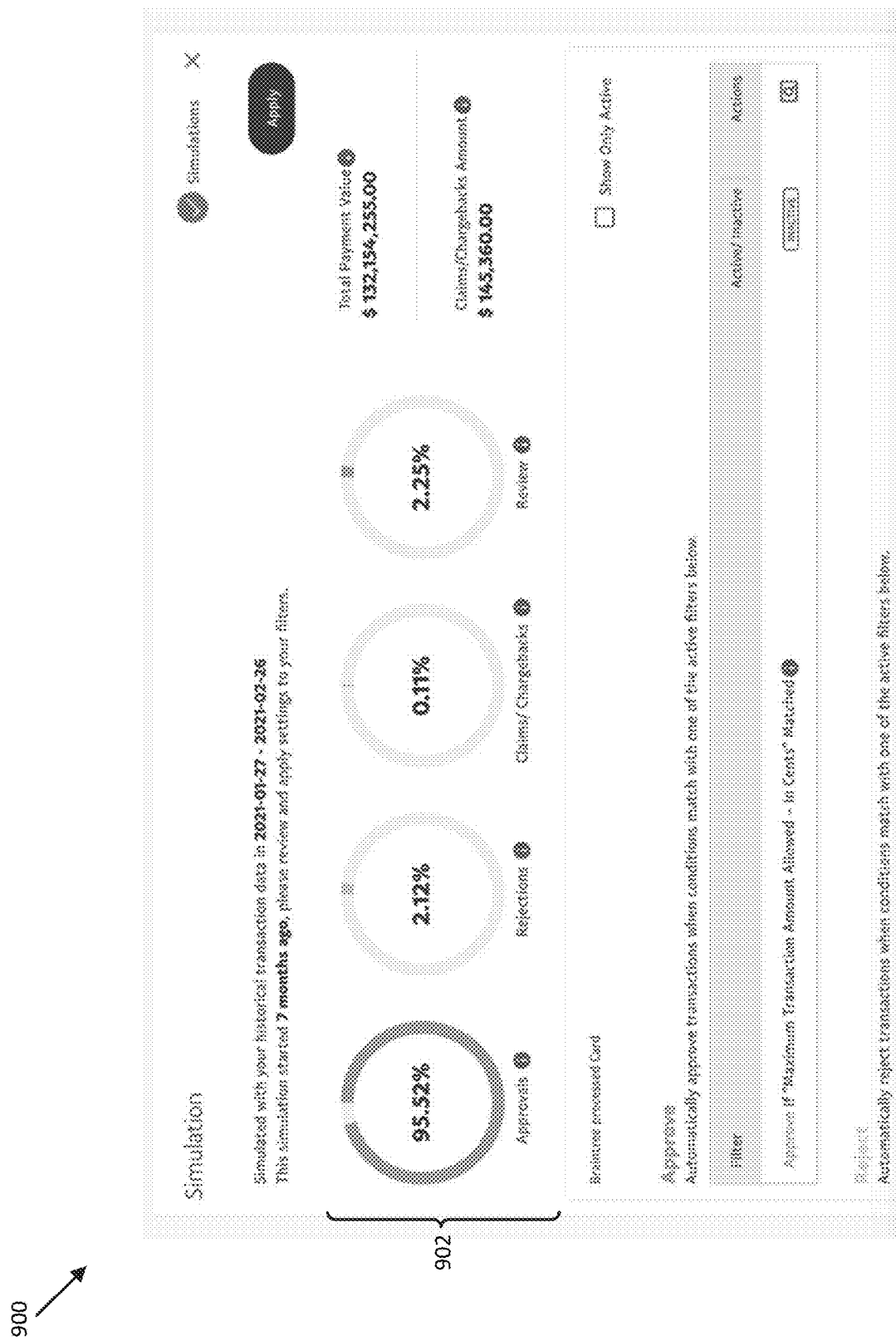
FIG. 9 illustrates a user interface screen for providing simulation results to a user in accordance with one or more embodiments of the present disclosure.

FIG. 9 illustrates a user interface screen 900 for providing simulation results 902 to a user in accordance with one or more embodiments of the present disclosure. For example, the simulation results 902 may include statistics for transaction approvals, transaction rejections, chargeback transactions, transactions requiring review, total payment value, and chargeback amount for the simulated period. In some embodiments, the computer system may compare the statistics in the simulation result to the performance metrics of the currently active processing rule filters. In some embodiments, the screen 900 may include indications as to which, if any, of the performance metrics would be improved by a threshold amount using the changed/tested processing rule filters.

Figure 10:
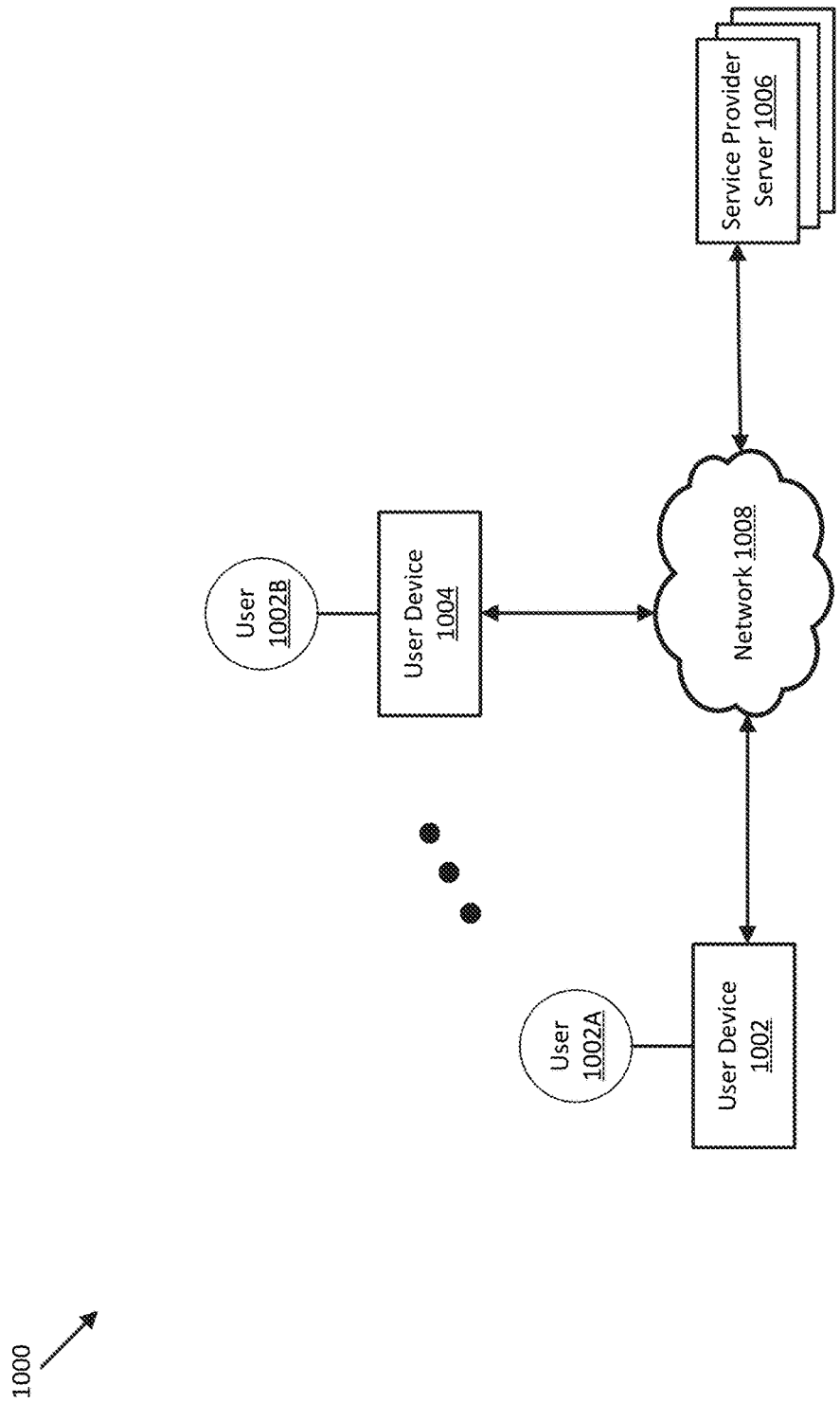
FIG. 10 illustrates a block diagram of a networked system configured to facilitate running simulations in accordance with one or more embodiments of the present disclosure is illustrated.

Referring now to FIG. 10, a block diagram of a networked system 1000 configured to facilitate running simulations in accordance with one or more embodiments of the present disclosure is illustrated. System 1000 includes a user device 1002, a user device 1004, and a peer-to-peer service provider server(s) 1006. A user 1002A is associated with user device 1002, where user 1002A can provide an input to service provider server 1006 using user device 1002. A user 1002B is associated with user device 1004, where user 1002B can provide an input to service provider server 1006 using user device 1002B.

User device 1002, user device 1004, and service provider server 1006 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 1000, and/or accessible over a network 1008. Each of the memories may be non-transitory memory. Network 1008 may be implemented as a single network or a combination of multiple networks. For example, in various embodiments, network 1008 may include the Internet or one or more intranets, landline networks, and/or other appropriate types of networks.

User device 1002 may be implemented using any appropriate hardware and software configured for wired and/or wireless communication over network 1008. For example, in some embodiments, user device 1002 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 1002 may include one or more browser applications which may be used, for example, to provide a convenient interface to facilitate responding to recipient account detail requests over network 1008. For example, in one embodiment, the browser application may be implemented as a web browser configured to view information available over the internet and respond to requests sent by service provider server 1006. User device 1002 may also include one or more toolbar applications which may be used, for example, to provide client-side processing for performing desired tasks in response to operations selected by user 1002A. In one embodiment, the toolbar application may display a user interface in connection with the browser application.

User device 1002 may further include other applications as may be desired in particular embodiments to provide desired features to user device 1002. For example, the other applications may include an application to interface between service provider server 1006 and the network 1008, security applications for implementing client-side security features, programming client applications for interfacing with appropriate application programming interfaces (APIs) over network 1008, or other types of applications. In some cases, the APIs may correspond to service provider server 1006. The applications may also include email, texting, voice, and instant messaging applications that allow user 1002A to send and receive emails, calls, and texts through network 1008, as well as applications that enable the user to communicate to service provider server 1006 as discussed above. User device 1002 includes one or more device identifiers which may be implemented, for example, as operating system registry entries, cookies associated with the browser application, identifiers associated with hardware of user device 1002, or other appropriate identifiers, such as those used for user, payment, device, location, and or time authentication. In some embodiments, a device identifier may be used by service provider server 1006 to associate user 1002A with a particular account maintained by the service provider server 1006. A communications application with associated interfaces facilitates communication between user device 1002 and other components within system 1000. User device 1004 may be similar to user device 1002.

Service provider server 1006 may be maintained, for example, by an online service provider which may provide electronic transaction services. In this regard, service provider server 1006 includes one or more applications which may be configured to interact with user device 1002 and user device 1004 over network 1008 to facilitate the peer-to-peer transaction services. Service provider server 1006 may maintain a plurality of user accounts (e.g., stored in a user account database accessible by service provider server 1006), each of which may include account information associated with individual users. Service provider server 1006 may communicate over network 1008 with a payment network and/or other network servers capable a transferring funds between financial institutions and other third-party providers to complete transaction requests and process transactions, as well as run simulations as discussed herein.

Figure 11:
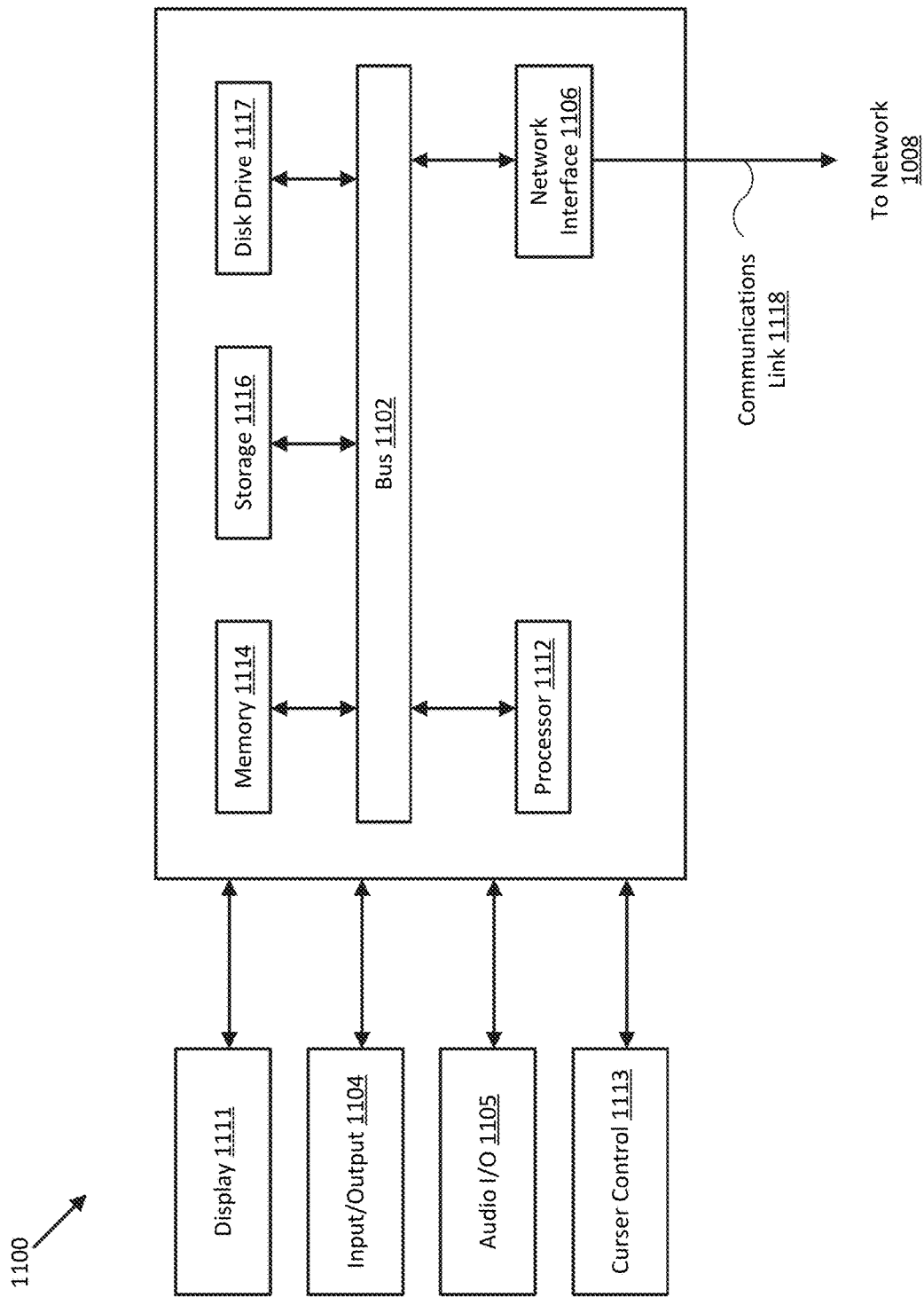
FIG. 11 illustrates a block diagram of a computer system implemented in accordance with one or more embodiments of the present disclosure.

FIG. 11 illustrates a block diagram of a computer system 1100 suitable for implementing one or more embodiments of the present disclosure. It should be appreciated that each of the devices utilized by users, entities, and service providers discussed herein (e.g., the computer system) may be implemented as computer system 1100 in a manner as follows.

Computer system 1100 includes a bus 1102 or other communication mechanism for communicating information data, signals, and information between various components of computer system 1100. Components include an input/output (I/O) component 1104 that processes a user action, such as selecting keys from a keypad/keyboard, selecting one or more buttons or links, etc., and sends a corresponding signal to bus 1102. I/O component 1104 may also include an output component, such as a display 1111 and a cursor control 1113 (such as a keyboard, keypad, mouse, etc.). I/O component 1104 may further include NFC communication capabilities. An optional audio I/O component 1105 may also be included to allow a user to use voice for inputting information by converting audio signals. Audio I/O component 1105 may allow the user to hear audio. A transceiver or network interface 1106 transmits and receives signals between computer system 1100 and other devices, such as another user device, an entity server, and/or a provider server via network 1008. In one embodiment, the transmission is wireless, although other transmission mediums and methods may also be suitable. Processor 1112, which may be one or more hardware processors, can be a micro-controller, digital signal processor (DSP), or other processing component, processes these various signals, such as for display on computer system 1100 or transmission to other devices via a communication link 1118. Processor 1112 may also control transmission of information, such as cookies or IP addresses, to other devices.

Components of computer system 1100 also include a system memory component 1114 (e.g., RAM), a static storage component 1116 (e.g., ROM), and/or a disk drive 1117. Computer system 1100 performs specific operations by processor 1112 and other components by executing one or more sequences of instructions contained in system memory component 1114. Logic may be encoded in a computer-readable medium, which may refer to any medium that participates in providing instructions to processor 1112 for execution. Such a medium may take many forms, including but not limited to, non-volatile media, volatile media, and transmission media. In various implementations, non-volatile media includes optical or magnetic disks, volatile media includes dynamic memory, such as system memory component 1114, and transmission media includes coaxial cables, copper wire, and fiber optics, including wires that comprise bus 1102. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1100. In various other embodiments of the present disclosure, a plurality of computer systems 1100 coupled by communication link 1118 to the network 1008 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
a non-transitory memory storing instructions; and
one or more hardware processors configured to read the instructions and cause the computer system to perform operations comprising:
retrieving one or more simulation filters selected in a user interface for a merchant user account of a merchant user, wherein the one or more simulation filters comprise one or more processing rule filters associated with a fraud protection service, and wherein the one or more simulation filters are usable for a simulation request from the merchant user account to simulate an approval and a rejection of a plurality of transactions between the merchant user account and a plurality of end users;
generating a simulation query based on the one or more simulation filters;
hashing the simulation query;
determining whether a simulation result corresponding to the hashed simulation query has been computed and stored prior to receiving the simulation request, wherein the simulation result includes a number of transactions that are approved, a number of transactions that are rejected, and a number of transactions that result in a chargeback during a simulated period associated with the simulation result; and
based on determining the simulation result has been previously computed and stored, providing the simulation result in the user interface.

2. The computer system of claim 1, wherein the operations further comprise:
retrieving one or more active filters;
generating a second simulation query based on the one or more active filters;
hashing the second simulation query;
computing the simulation result based on the one or more active filters and a transaction history of the merchant user account; and
storing the simulation result with a mapping to the hashed second simulation query.

3. The computer system of claim 2, wherein the determining whether the simulation result corresponding to the hashed simulation query has been computed and stored prior to receiving the simulation request comprises:
determining whether the hashed simulation query matches the hashed second simulation query.

4. The computer system of claim 1, wherein the operations further comprise receiving, from the merchant user account, the simulation request through the user interface.

5. The computer system of claim 2, wherein the retrieving the one or more active filters, the generating the second simulation query, the hashing the second simulation query, the computing the simulation result, and the storing the simulation result are performed periodically for the merchant user account.

6. The computer system of claim 1, wherein the simulation request includes a first simulation request, and wherein the simulation request further includes a second simulation request made in parallel with the first simulation request.

7. The computer system of claim 1, wherein the simulation result comprises one or more of a transaction approval score, a transaction rejection score, a transaction chargeback score, or a transaction volume for the simulated period.

8. A method comprising:
at predefined intervals:
retrieving, by a computer system, one or more active fraud filters for a merchant account with a service provider, wherein a use of the one or more active fraud filters enables an approval or a rejection of a plurality of transactions between the merchant account and a plurality of end users for the service provider;
generating, by the computer system, a simulation query based on the one or more active fraud filters;
hashing, by the computer system, the simulation query;
computing, by the computer system for a simulation period, a simulation result based on the one or more active fraud filters and a transaction history for the merchant account, wherein the simulation result includes a number of transactions that are approved, a number of transactions that are rejected, and a number of transactions that are associated with a chargeback during the simulation period; and storing, by the computer system, the simulation result with a mapping to the hashed simulation query.

9. The method of claim 8, wherein the one or more active fraud filters are configured to reject transactions for the merchant account.

10. The method of claim 9, wherein the one or more active fraud filters comprise a transaction risk score filter, and wherein transactions having transaction risk scores that do not meet a threshold for the transaction risk score filter are rejected.

11. The method of claim 8, wherein the predefined intervals are daily intervals.

12. The method of claim 8, further comprising:
receiving, by the computer system, a simulation request from or for the merchant account;
retrieving, by the computer system, one or more simulation filters selected by a user in a user interface for submitting the simulation request;
generating, by the computer system, a second simulation query based on the one or more simulation filters;
hashing, by the computer system, the second simulation query; and
determining, by the computer system, whether a simulation result corresponding to the hashed second simulation query has been computed and stored prior to receiving the simulation request.

13. The method of claim 12, further comprising:
determining, by the computer system, the simulation result corresponding to the hashed second simulation query has been previously computed and stored, wherein the hashed second simulation query matches the hashed simulation query; and
providing, by the computer system, the simulation result in the user interface.

14. The method of claim 12, further comprising:
determining, by the computer system, the simulation result has not been previously computed nor stored;
computing, by the computer system, the simulation result for the second simulation query;
storing, by the computer system, the simulation result for the second simulation query with a mapping to the hashed second simulation query; and
providing, by the computer system, the simulation result for the second simulation query in the user interface.

15. The method of claim 8, wherein the simulation result comprises at least one of a transaction approval score, a transaction rejection score, or a transaction chargeback score.

16. A non-transitory machine-readable medium having instructions stored thereon, wherein the instructions are executable to cause a machine of a system to perform operations comprising:
Retrieving one or more first simulation filters selected in a user interface for a merchant user account, wherein the one or more first simulation filters comprise fraud filters and are configured to enable a simulation result to indicate an approval and a denial of a plurality of transactions between the merchant user account and a plurality of end users;
generating a simulation query based on the one or more first simulation filters;
hashing the simulation query;
determining whether the simulation result corresponding to the hashed simulation query has been stored in a database;
based on determining the simulation result has not been stored in the database, computing the simulation result for a simulation period based on the one or more first simulation filters and a transaction history for the merchant user account, wherein the simulation result is computed based on a number of transactions that are approved, a number of transactions that are rejected, and a number of transactions associated with a chargeback during the simulated period; and
storing the simulation result in the database with a mapping to the hashed simulation query.

17. The non-transitory machine-readable medium of claim 16, wherein the operations further comprise providing the simulation result in the user interface.

18. The non-transitory machine-readable medium of claim 16, wherein the operations further comprise:
generating a second simulation query based on one or more second simulation filters different from the one or more first simulation filters;
hashing the second simulation query;
determining that the hashed second simulation query matches the hashed simulation query; and
providing the simulation result in the user interface for the merchant user account.

19. The non-transitory machine-readable medium of claim 16, wherein the database comprises a no-SQL database.

20. The non-transitory machine-readable medium of claim 16, wherein the simulation result comprises predicted chargeback transactions over the simulation period.

* * * * *